(12) United States Patent
Dempsey et al.

(10) Patent No.: US 6,629,201 B2
(45) Date of Patent: Sep. 30, 2003

(54) SYSTEM AND METHOD FOR HIGH-SPEED SUBSTITUTE CACHE

(75) Inventors: Michael Dempsey, Maynard, MA (US); Eric Dickman, Newton, MA (US)

(73) Assignee: SuperSpeed Software, Inc., Sudbury, MA (US)

( * ) Notice: Subject to any disclaimer, the term of this patent is extended or adjusted under 35 U.S.C. 154(b) by 77 days.

(21) Appl. No.: 09/847,638

(22) Filed: May 2, 2001

(65) Prior Publication Data

US 2001/0037433 A1 Nov. 1, 2001

Related U.S. Application Data

(60) Provisional application No. 60/204,266, filed on May 15, 2000, and provisional application No. 60/248,431, filed on Nov. 14, 2000.

(51) Int. Cl.[7] .............................................. G06F 12/06
(52) U.S. Cl. ..................................................... 711/113
(58) Field of Search ................................ 711/113, 129, 711/138, 139

(56) References Cited

U.S. PATENT DOCUMENTS

| | | | |
|---|---|---|---|
| 4,794,523 A | 12/1988 | Adan et al. ................. 364/200 |
| 5,475,840 A | 12/1995 | Nelson et al. .............. 395/700 |
| 5,581,736 A | 12/1996 | Smith ..................... 395/497.01 |
| 5,606,681 A | 2/1997 | Smith et al. ................. 395/413 |
| 5,644,539 A | 7/1997 | Yamagami et al. ......... 365/200 |
| 5,732,241 A | 3/1998 | Chan .......................... 395/458 |
| 5,787,466 A | 7/1998 | Berliner ...................... 711/117 |
| 5,805,809 A | * 9/1998 | Singh et al. ........... 395/200.33 |
| 5,860,083 A | 1/1999 | Sukegawa ................... 711/103 |
| 5,933,630 A | 8/1999 | Ballard et al. .............. 395/651 |
| 5,987,565 A | 11/1999 | Gavaskar .................... 711/112 |
| 6,026,474 A | 2/2000 | Carter et al. ................ 711/202 |
| 6,085,287 A | 7/2000 | O'Neil et al. ............... 711/113 |
| 6,094,695 A | 7/2000 | Kornher ....................... 610/56 |
| 6,128,675 A | 10/2000 | Ko ................................ 710/23 |
| 6,150,839 A | 11/2000 | New et al. .................... 326/40 |
| 6,151,664 A | 11/2000 | Borkenhagen et al. ...... 711/150 |
| RE36,989 E | 12/2000 | White ......................... 711/118 |
| 6,389,427 B1 | * 5/2002 | Faulkner .................. 707/104.1 |

OTHER PUBLICATIONS

Teorey et al., "A Comparative Analysis of Dish Scheduling Policies", p 177–184, ACM, vol. 15, No. 3, Mar. 1972.*

Shenoy et al., "Cello: A Dish Scheduling Framework for Next Generation Operating Systems", ACM, p 44–55, 1998.*

Hallnor, "A Fully Associative Software—Managed Cache Design", 2000, ACM, p 107–116.*

Iyengar, "Design and Performance of a General—Purpose Software Cache", 1999, p 329–336, IEEE.*

* cited by examiner

*Primary Examiner*—Kevin L. Ellis
(74) *Attorney, Agent, or Firm*—Bromberg & Sunstein LLP

(57) ABSTRACT

Methods of caching data in a computer wherein a cache is given a number of caching parameters. In a method for caching data in a computer having an operating system with a file caching mechanism, the file caching mechanism is selectively disabled and a direct block cache is accessed to satisfy a request of the request stream. Cache memory can be expanded by allocating memory to a memory table created in a user mode portion of the computer and having a set of virtual memory addresses. Methods of caching data can include creating an associative map, and optimizing the order of writes to a disk with a lazy writer. Methods are further assisted by displaying cache performance criteria on a user interface and allowing user adjustment of caching parameters such as cache size, cache block size and lazy writer aggressiveness. A user may further be given the ability to enable or disable a cache for a given selected disk volume.

75 Claims, 11 Drawing Sheets

SYSTEM AND METHOD FOR HIGH-SPEED SUBSTITUTE CACHE

This application claims priority from U.S. Patent Application No. 60/204,266, filed May 15, 2000 and No. 60/248,431, filed Nov. 14, 2000, both of which are hereby incorporated by reference herein.

TECHNICAL FIELD

The present invention is directed to a disk caching technique. In particular, certain embodiments are directed to disk caching software for use with an operating system.

BACKGROUND OF THE INVENTION

Computer users are always looking for ways to speed up operations on their computers. One source of the drag on computer speed is the time it takes to conduct an input/output operation to the hard disk drive or other mechanical disk devices. Such devices are slowed by mechanical movement latencies and I/O bus traffic requirements. One conventional method for avoiding this speed delay is to cache frequently accessed disk data in the computer main memory. Access to this cached data in main memory is much quicker than always accessing the hard disk drive for the data. Access speed to a hard disk drive is replaced by main memory access speed to the data resident in the cache.

SUMMARY OF THE INVENTION

A method of caching data in a computer having an operating system with a file caching mechanism comprises, in one embodiment: intercepting an input/output request stream; disabling the file caching mechanism with respect to all requests in the request stream that are directed to at least one selected disk volume; and accessing a direct block cache to satisfy a request of the request stream. Further related embodiments include a method of caching data in a computer having a window-based operating system, and a method wherein the step of disabling the file caching mechanism comprises disabling the mechanism based on disk volume identifier entries in a look-up table, which may be adjusted in accordance with input from a user.

In a further embodiment, a method comprises: in a cache list, searching for blocks, each of which contains data, written as a result of a write request, that is more recent than data present in the corresponding block on a mechanical disk; when a quota number of such blocks is found, sorting the blocks into an optimal write order; and generating at least one request to write the blocks to the mechanical disk in the optimal write order. The step of searching for blocks may be instituted periodically, with a wake-up time period, which may be adjusted in accordance with user input. The quota number may also be adjusted in accordance with user input, and the set of steps of searching, sorting, and writing may be activated and deactivated. In one embodiment, the step of sorting comprises sorting the blocks such that the blocks are ordered in accordance with a count of physical memory locations, one physical memory location corresponding to each block, the count beginning at a physical memory location on an outermost track of the disk, counting in a rotation direction around the outermost track, and continuing by moving in one track and counting in the same rotation direction upon reaching a location that has already been counted, until a final memory location on an innermost track is reached.

Yet another embodiment comprises creating an associative map which, for each given block of a set of blocks, maps a block identifier for the given block to a pointer, the pointer taking a value chosen from the values of: (i) a pointer value signifying that there is no data in cache memory corresponding to the given block; and (ii) a pointer value that points to a cache memory location containing data from the given block. The method may further comprise, upon receipt of an input/output request involving a block of the set of blocks, determining the value of the pointer to which the block identifier for the block is mapped in the associative map; and may comprise, upon determining that the value of the pointer is the pointer value that points to a cache memory location containing data from the given block, accessing the cache memory location to satisfy the input/output request. The method may also comprise, upon determining that the value of the pointer is the pointer value that points to a cache memory location containing data from the given block, updating a least recently used counter field for the given block in the cache memory location to be equal to the value of a global least recently used counter.

In a further related embodiment, the method comprises, upon determining that the value of the pointer is the pointer value signifying that there is no data in cache memory corresponding to the given block, generating a request to receive a free block of memory to be used as a new cache memory block. The method may also comprise, upon receiving the request for a free block of memory, determining whether a virtual address from a memory table of virtual memory addresses is available for use by the direct block cache; and, if so, causing the memory block corresponding to the virtual address to be used as the new cache memory block. Additionally, the method may comprise, if a virtual address from the memory table is not available for use by the direct block cache, (i) searching for block identifiers in the associative map which are mapped to pointers having a pointer value that points to a cache memory location containing data, and associating each such block identifier with a least recently used counter from the cache memory location to which each block identifier corresponds;

(ii) sorting the block identifiers according to the numerical order of the least recently used counters to which they correspond; and (iii) for each of a number of the lowest ordered block identifiers that is at least one, causing the memory block corresponding to the pointer value, to which the at least one block identifier is mapped, to be added to a list from which the new cache memory block may be chosen.

In further related embodiments, the method comprises adjusting the number of the lowest ordered block identifiers in accordance with a user input maximum and minimum, such that a number, representing the block identifiers which are mapped to pointers having a pointer value that points to a cache memory location containing data, does not fall below the minimum or exceed the maximum. Such a maximum and minimum may be adhered to for each disk volume of a set of disk volumes.

In further embodiments, a method of caching comprises adjusting, by number of sectors of data per block, a size per block of a set of blocks in accordance with user input; the size per block may, for example, range from 2 sectors per block to 64 sectors per block. Another embodiment comprises caching metafile data for a file system of the operating system.

In a still further embodiment, a method of caching data in a computer having an operating system, a kernel mode portion with limited memory, and a user mode portion, comprises providing an expanded memory to a cache operating in the kernel mode portion. An embodiment of the method includes creating, in the user mode portion, at least one memory tables comprising a set of virtual memory addresses; and accessing a memory table of the at least one memory tables when allocating memory to a cache. More than one such memory table may be created, and the number created may be adjusted in accordance with user input. Context switching may be used between tables of the more than one memory tables. Memory tables containing virtual addresses corresponding to at least 2 GB of memory may be created. The method may also utilize a program of the operating system, that is used for setting up user process virtual address maps, to create the at least one memory table.

A still further embodiment provides a user interface through which cache performance data can be displayed, cache parameters can be adjusted and a cache itself or cache features can be enabled or disabled.

The above embodiments may be used in many different possible combinations, as will be apparent from the below. Additionally, embodiments which are cache processes operating in computers have analogous features to those just summarized, as will also be apparent from the below.

DESCRIPTION OF SPECIFIC EMBODIMENTS

Embodiments of the invention provide a high-speed direct block cache that can be selectively substituted for the file caching mechanism of an operating system. Caches according to embodiments of the invention can markedly increase computer system speed, as compared with the speed of systems using conventional file caching mechanisms of existing operating systems. In addition to gaining speed by eliminating the wasted overhead of creating a file cache each time a file is opened, embodiments of the invention also increase speed by providing a substitute cache that is user-tunable and has an associative map, a lazy writer, and a cache memory enhancer.

Embodiments of the invention are advantageous for accelerating applications which are input and output intensive, and are particularly advantageous for applications which involve frequent access to files. Important examples include applications used by servers, such as World Wide Web servers, to enable widespread access to the Internet.

Additionally, embodiments of the invention are useful for enhancing performance with the WINDOWS NT or WINDOWS 2000 operating systems, sold at the time of filing by Microsoft Corp. of Redmond, Wash. However, the invention is not limited to use with these operating systems, nor to running with a particular class of applications, and it may be used with any hard disk drive, disk controller, or RAID scheme.

Figure 1:
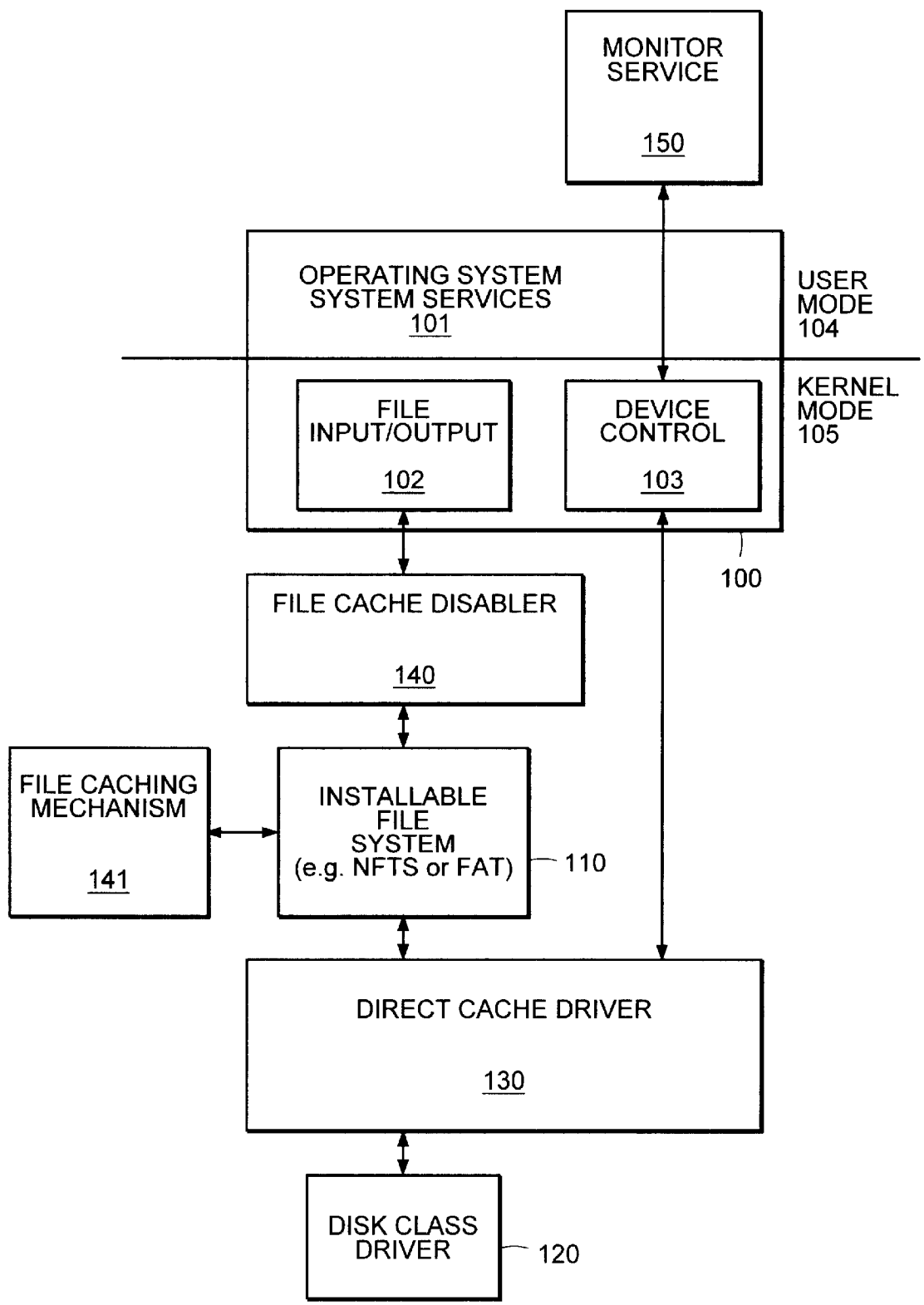
FIG. 1 is a block diagram of the architecture of a system operating cache software according to an embodiment of the invention.

FIG. 1 is a block diagram of the architecture of a system operating cache software according to an embodiment of the invention. Blocks 100, 110, 120, and 141 are standard components of an operating system, such as WINDOWS NT or WINDOWS 2000, with which the cache software may be used. Cache driver 130, file cache disabler 140, and memory monitor 150 are components of the cache software. Preferably, the cache driver 130 is loaded as a file system intermediate filter driver during system bootstrap, in a fashion generally known, for loading other drivers, by those of skill in the art.

The illustrated standard operating system components include WIN32 system services 101, which may be replaced by another form of system services when embodiments of the invention are used with a different operating system. Within system services 101 is file input/output device 102, which generates requests to read data from, or write data to, files. File input/output device 102 typically communicates with installable file system 110 in the absence of a file cache disabler 140 according to the invention. However, in accordance with embodiments of the invention, when cache driver 130 is loaded, file cache disabler 140 operates as a filter between file input/output 102 and installable file system 110 of the operating system.

Many known operating systems, such as WINDOWS NT, set up their own file caching mechanism 141 which communicates with installable file system 110. When a file is accessed by file input/output 102, the operating system sets the status of a switch which indicates whether the file should be opened with or without file caching; by default, the operating system sets the switch to open files with file caching. The switch referred to herein is typically an enable bit in the header of the file being opened. The state of the switch—enable or disable—is determined by the state of the bit –1 or 0. When a file is opened with file caching, file cache mechanism 141 sets up a file cache data structure to cache the individual file. For many desk-top computer users, such an arrangement provides efficient caching, since the user has only a few files open at one time, and thus few file cache data structures are created. But if a system is opening and closing many files, or opening the same file many times in a row, file caching becomes inefficient: file cache data structures, established to cache each file, are continually being created and destroyed. If the same file is opened multiple times, a file cache data structure is created each time. This wasted creation of data structures can be particularly great on a web server, for example, which may open the same file many times in a row to provide access to the same web page to many different users. The wasted creation of data structures is, in fact, encountered with any application that is file input/output intensive.

To eliminate wasted creation of file cache data structures, embodiments of the invention provide file cache disabler 140. In a preferred embodiment, file cache disabler 140 is implemented with a look-up table, which maps each disk volume of a system to an indicator. When file cache disabler 140 receives an input or output request from file input/output 102 involving opening a file on a disk volume, it consults the look-up table for the disk volume. If the indicator is on for that disk volume, disabler 140 turns off the operating system's file caching switch for that file. Typically, the file cache is switched off by appropriately setting a file cache enable bit in the header of the file. Thus, file caching will not be used for caching the file, and no file cache data structure will be created. In accordance with embodiments of the invention, the entries in the look-up table can be modified in accordance with user input, thereby enabling users to choose disk volumes for which the file caching mechanism 141 is disabled.

In place of the file caching mechanism, embodiments of the invention provide a substitute caching driver 130 which directly caches blocks of data without setting up file cache data structures. Thus, for example, when the same file is opened and closed in succession while other files are accessed, substitute caching driver 130 begins caching blocks of the file when it is first opened, and then is able to access the blocks from the cache every subsequent time that the file is reopened. Because file cache disabler 140 disables the file caching mechanism 141, a file cache data structure will not be created and destroyed each time the file is opened and closed; instead, the blocks are cached directly, without creating a file cache data structure. Thus great efficiencies can be realized for applications that are file input/output intensive.

It should be noted however, that cache driver 130 is not limited to being used when file caching mechanism 141 is disabled. Because the file cache disabler 140 allows file caching mechanism 141 to be turned on or off for selected disk volumes in accordance with user input, it is possible for some disk volumes to be cached by cache driver 130 alone, while others are cached by both cache driver 130 and file caching mechanism 141. A user may cache all disk volumes with both caches. However, if the two are operated simultaneously, file caching mechanism 141 creates a file cache data structure for each file that is accessed, while cache driver 130 sufficiently caches the blocks of the file in its own cache. Operating the two simultaneously thus creates wasteful file cache data structures, and is less efficient for file input/output intensive applications.

Installable file system 110 generates input/output request packets—that is, requests to read data from, or write data to, a mechanical disk such as a hard drive. These requests are intercepted by cache driver 130, which processes the requests in a manner described below and notifies the installable file system 110 of the completion of the requests. Without a cache, these requests would be completed directly by disk class driver 120; thus, from the point of view of the installable file system 110 the cache driver 130 fills the role of a disk class driver 120. However, instead of fulfilling the requests by time-consuming reads from, and writes to, the mechanical disk, the cache driver allows data to be read from, and written to, the computer's main memory, thereby speeding up operation.

As shown in FIG. 1, computers are typically divided into a user mode portion 104 and a kernel mode portion 105. Monitor service 150 is a user mode process created by the cache driver 130 at system startup, and provides enhanced memory space for the cache in the user mode portion, as compared with the kernel mode space typically available with existing operating systems. Once the enhanced memory space is created, monitor service 150 itself typically remains inactive, but cache driver 130 accesses the enhanced memory for use as cache memory, in a manner that will be described further below.

Figure 2:
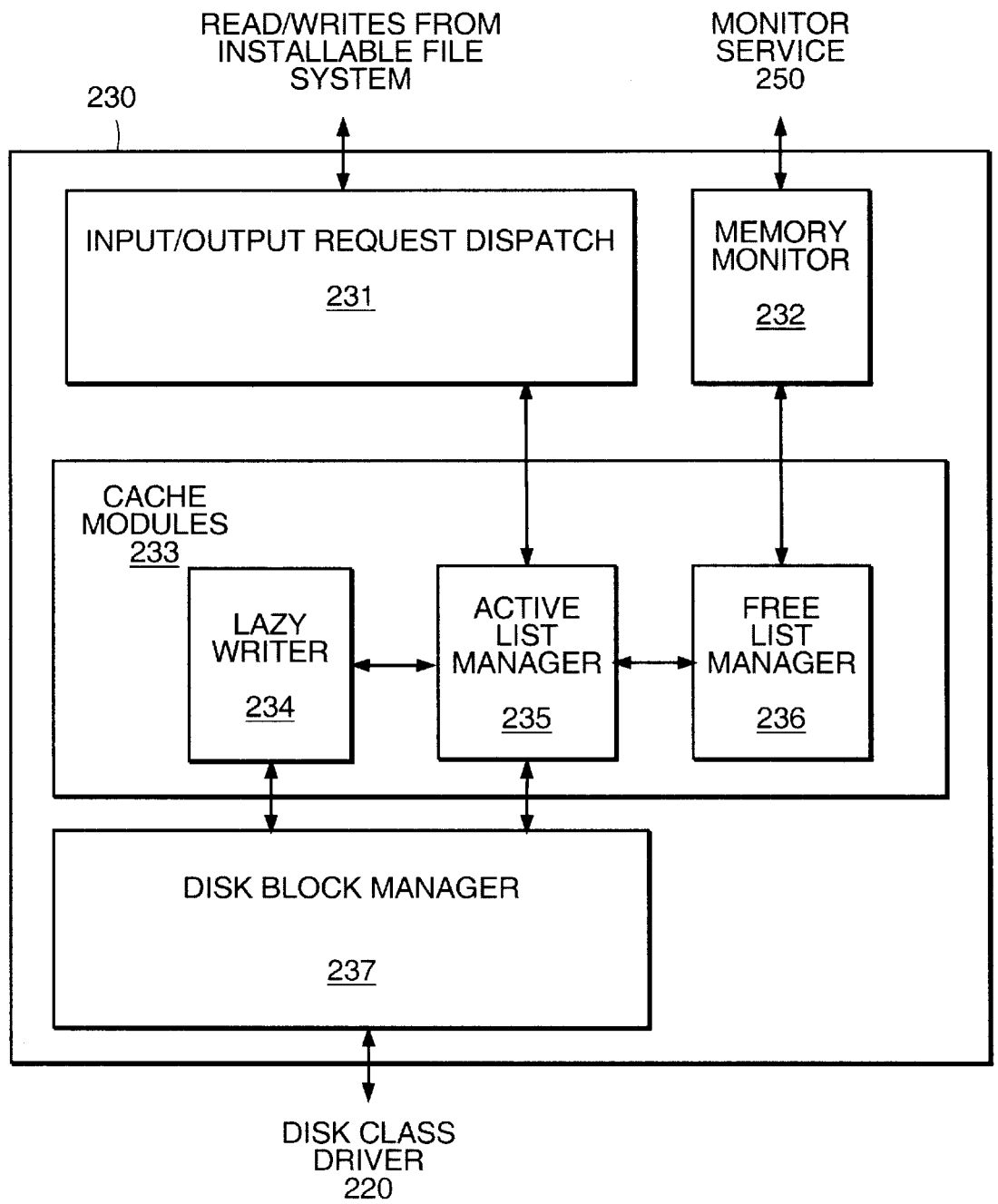
FIG. 2 is a block diagram of components of a cache driver according to an embodiment of the invention.

FIG. 2 is a block diagram of components of a cache driver 230 according to an embodiment of the invention. Request dispatch 231 serves as cache driver 230's interface with installable file system 110: it receives and interprets input/output request packets from installable file system 110 for disk volumes serviced by cache driver 230 and notifies installable file system 110 when a request has been fulfilled. Similarly, disk block manager 237 serves as cache driver 230's interface with disk class driver 220, by providing the cache driver 230 with the ability to read from, and write to, sectors on a mechanical disk. Since request dispatch 231 and disk block manager 237 interface with the operating system, they conform to the operating system's driver model requirements; thus, for example, a cache driver 230 used with the WINDOWS NT operating system conforms to the WINDOWS NT driver model requirements.

Memory monitor 232 tracks the amount of memory that the cache system consumes, and compares, it with pre-established upper and lower bounds. If the amount of memory exceeds the upper bound, the monitor shrinks available cache memory by locking pages in a virtual address space reserved by monitor service 250. Conversely, if the amount of memory is less than the lower bound, the monitor increases available cache memory by unlocking pages in the virtual address space. The terms "pages" and "blocks" are used interchangeably herein. Memory monitor 232 also communicates with free list manager 236 and monitor service 250.

Cache modules 233 are the core components of the cache driver 230: lazy writer 234, active list manager 235, and free list manager 236. When cache driver 230 is enabled, upon receiving an interpreted request from input/output request dispatch 231 involving a block of data, active list manager 235 determines whether data from the block is already associated with a cache list (which is preferably implemented as an associative map as described below). If the data is already associated with the cache list, active list manager 235 accesses the cached data to satisfy the request, either by reading from it or overwriting it. If the data is not already associated with the cache list, active list manager 235 requests a new cache memory page from free list manager 236, and upon receiving the new page instructs disk block manager 237 to fill the new cache page with the request data. For a read request, the data can then be used to satisfy the request; for a write request, writing to the new cache page enables subsequent writing to disk to satisfy the request. If the user has disabled the loaded cache driver 230, the active list manager 235 operates in a low overhead pass-through mode. In this mode, input/output request dispatch 231 requests go straight to the disk block manager 237.

Free list manager 236 maintains a list of unused cache memory pages, which it supplies to active list manager 235 when active list manager 235 requests a new cache memory page. When free list manager 235's list of unused pages reaches a pre-set minimum size, it requests additional memory from memory monitor 232. If memory monitor 232 indicates that the cache memory upper bound has been reached, free list manager 236 removes memory pages from association with the active list manager 235's cache list, and adds them to its list of unused cache memory pages.

The size of each cache page, in accordance with an embodiment of the invention, is set by the free list manager 236 in response to a user input. For improved efficiency, the user should try to set a cache page size which is on average about the size of the I/O request responses of the user applications being run. To facilitate adjustment of cache page sizes and management of cache pages, a cache page is always of a size equal to a power of 2 times two 512 byte sectors. Thus, for example, a cache page may be 1024, 2048, 4096, 8192, 16384, 32768 or 65536 bytes. As a user reduces page size, for each step reduction, the active and free lists are doubled in size. All of the old entries remain but containing only the upper half of the data. New page entries are inserted with the lower half of the data. When page size is increased by the user, the active and free lists are reduced in size by half and every second list entry is merged with its list predecessor.

Lazy writer 234 optimizes the speed with which write requests are written to disk. In accordance with embodiments of the invention, lazy writer 234 can be activated or deactivated in accordance with user input; when it is deactivated, requests to write blocks of data to the mechanical disk may be made in an order that requires the mechanical disk write head to move in an inefficient order amongst physical memory locations on the disk. When lazy writer 234 is activated, it periodically searches for pages in the active list manager 235's cache list that contain "dirty blocks," i.e. blocks containing data from write requests that is newer than the corresponding data on the mechanical disk. Lazy writer 234 then sorts the dirty blocks into an order that minimizes the amount of write head repositioning amongst cylinders of the mechanical disk, thereby maximizing the speed of writes to disk. Once the blocks are sorted, lazy writer 234 instructs disk block manager 237 to write the blocks to disk in the sorted order.

Figure 3:
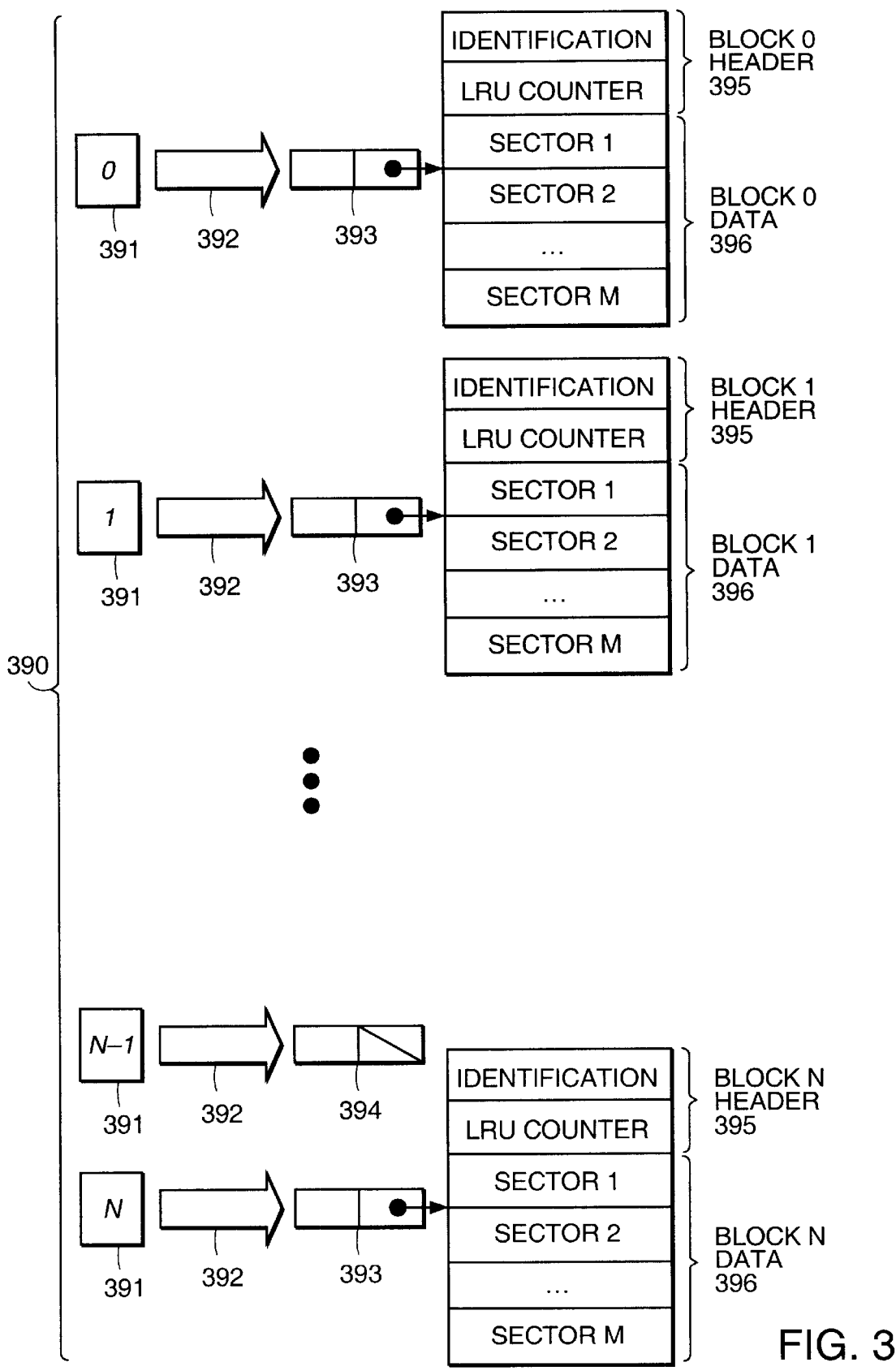
FIG. 3 shows an associative map formed by an active list manager according to an embodiment of the invention.

FIG. 3 shows an associative map 390 formed by an active list manager according to an embodiment of the invention. Associative map 390 maps each of a set of block identifiers 391 by a mapping 392 to a pointer 393, 394. Cache driver 230 sets up such a map for each disk volume that it caches, and the cache components then follow the procedures described herein for each associative map.

A block of data (or "page" of data) is a unit, defined by cache driver 130, that contains data from a number of contiguous disk sectors (a sector conventionally being 512 bytes). The number of sectors per block may be set in accordance with user input, preferably ranging from 2 to 64 sectors per block, in embodiments of the invention. It is often important for a user to tune the number of sectors per block, in order to obtain the best cache performance for a given application.

A block identifier 391 can be any symbol that represents a disk block, and is preferably implemented as a 4-byte entry for each disk block. In FIG. 3, block identifiers 391 are shown corresponding to blocks 0 through N of a set of disk blocks. The size of the block identifiers and the number of sectors per block determines the amount of memory required to create the associative map. For example, if a 4-byte entry were used as a block identifier for a block of size 8-kilobytes, the associative map overhead would be 0.05% of the cached disk volume size. So, to map an 8-gigabyte volume, 4-megabytes of memory would be required. To cache extremely large disk volumes, sectors per block should be increased to produce a smaller associative map overhead. For example, if the 4-byte block identifier were instead used for 32-kilobyte blocks, the associative map overhead would be reduced to about 0.01% of the cached disk volume size.

Earlier cache designs avoided associative maps because such maps have high fixed system memory requirements. However, because main memory for computers is becoming less expensive, this drawback of using associative maps for caching is less of a problem, and is compensated by fast, straightforward block look-up.

As can be seen from FIG. 3, the associative map 390 maps each block identifier 391, by a mapping 392, to a pointer 393, 394. The pointer can take two possible types of values. Values of type 393, shown in the example of FIG. 3 for blocks 0, 1, and N, point to a block data structure 395,396 in cache memory. Each block data structure contains a header 395 for the block, which includes a data field identifying the block, and a least recently used counter (LRU counter) which is used to determine how recently the cache memory block was last accessed, and is preferably a 64 bit counter. Each block data structure also contains data 396 from the sectors (1 through M, for M sectors per block) of which the block is composed. Pointer values of type 394, shown in the example of FIG. 3 for block N-1, indicate that there is no block data structure in cache memory corresponding to the block identified by the block identifier.

Figure 4:
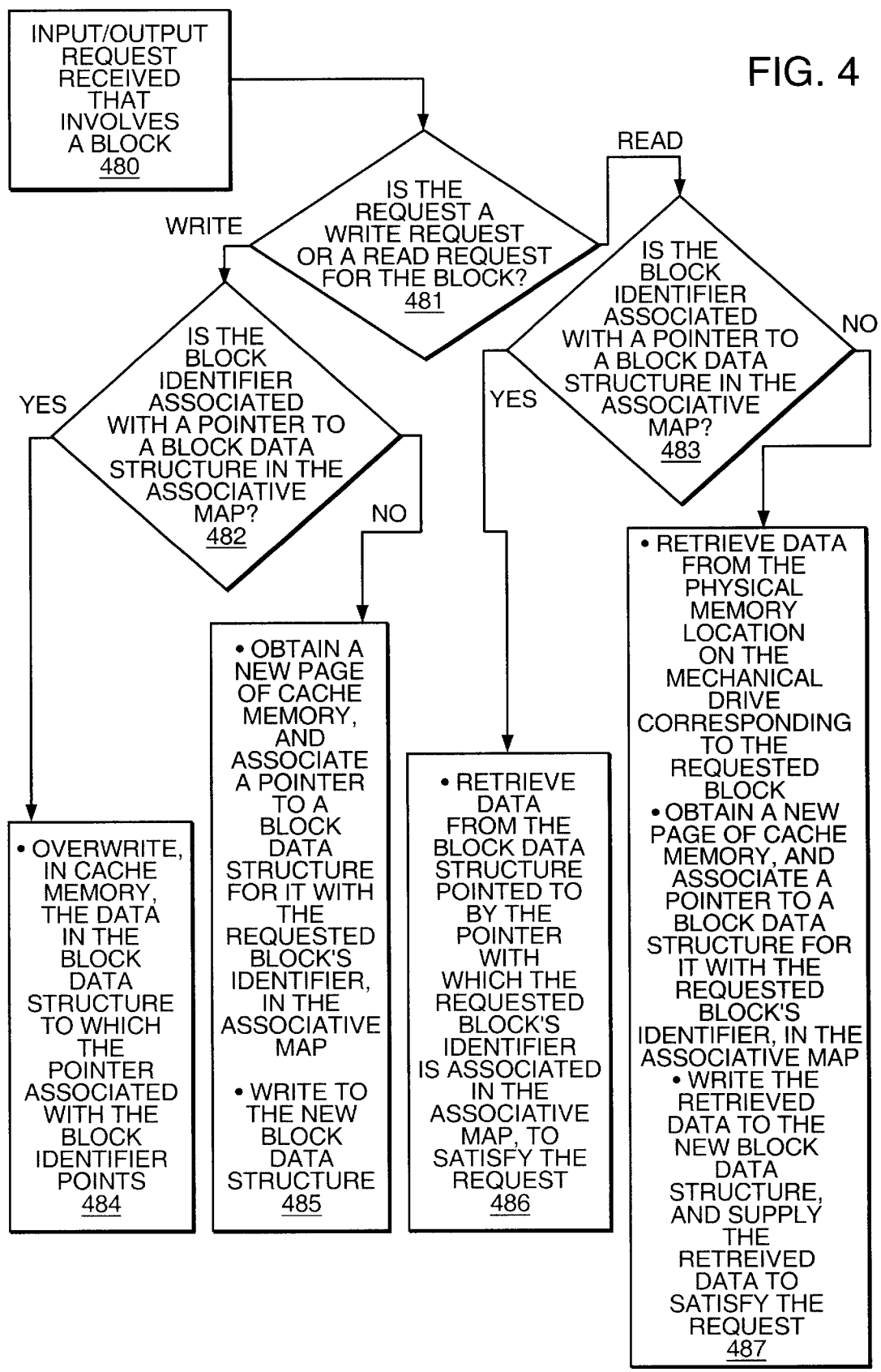
FIG. 4 is a flowchart of an associative map process implemented by an active list manager according to an embodiment of the invention.

FIG. 4 is a flowchart of an associative map process implemented by an active list manager according to an embodiment of the invention. In step 480, the active list manager receives an input/output request involving a block. The active list manager determines whether the request is a write request or a read request (step 481), and whether the block identifier for the block is associated with a pointer with a value of type 393, i.e. a pointer to a block data structure, in the associative map (steps 482, 483). If the request is a write request and the block identifier is associated with a pointer to a block data structure, then the active list manager causes the data in the block data structure to be overwritten with the new write request data (step 484). If the request is a write request and the block identifier is not associated with a pointer to a block data structure, then the active list manager requests a new page of cache memory from the free list manager, and associates a pointer to a block data structure for the new page with the requested block's block identifier, in the associative map. Once this is done, the active list manager causes the write request data to be written to the newly obtained cache memory block data structure (step 485).

Similarly, if the request is a read request, and the block identifier is associated with a pointer to a block data structure in the associative map, the active list manager causes the data from the block data structure to be retrieved to satisfy the read request (step 486). But if the request is a read request, and the block identifier is not associated with a pointer to a block data structure in the associative map, then the active list manager instructs the disk block manager to retrieve the requested data from the mechanical disk. Then it requests a new page of memory from the free list manager, and associates the block identifier with a pointer to a block data structure for the new page, in the associative map. Once this is done, the active list manager causes the data retrieved from disk to be written to the new block data structure, and supplies the retrieved data to satisfy the request (step 487).

Each time that the active list manager accesses a block data structure in the associative map, whether to read from it or write to it, it updates the LRU counter for the data structure to a global LRU value. Similarly, when a new block data structure is added to the associative map, the LRU counter is initialized to the global LRU value. By comparing LRU counters for two block data structures in cache memory, it can therefore be determined which block of data most recently had a request directed to it; lower LRU counters correspond to less recently accessed blocks. Systems experiencing high input/output demands for long periods of time might experience an overflow of the LRU counter. In such a case, all block data structures in the associative map are marked with the new LRU counter values.

Conventional operating systems, such as WINDOWS NT, only allow kernel mode software to access a "non-page pool" of addresses, in kernel space, which contains as little as, 256 megabytes of addresses. Since the size of cache memory determines the amount of data that can be cached, which determines system speed, the operating system limit on memory access to a non-page pool in kernel space is a constraint on system performance. To overcome this constraint, embodiments of the invention allow expansion of cache memory.

Figure 5:
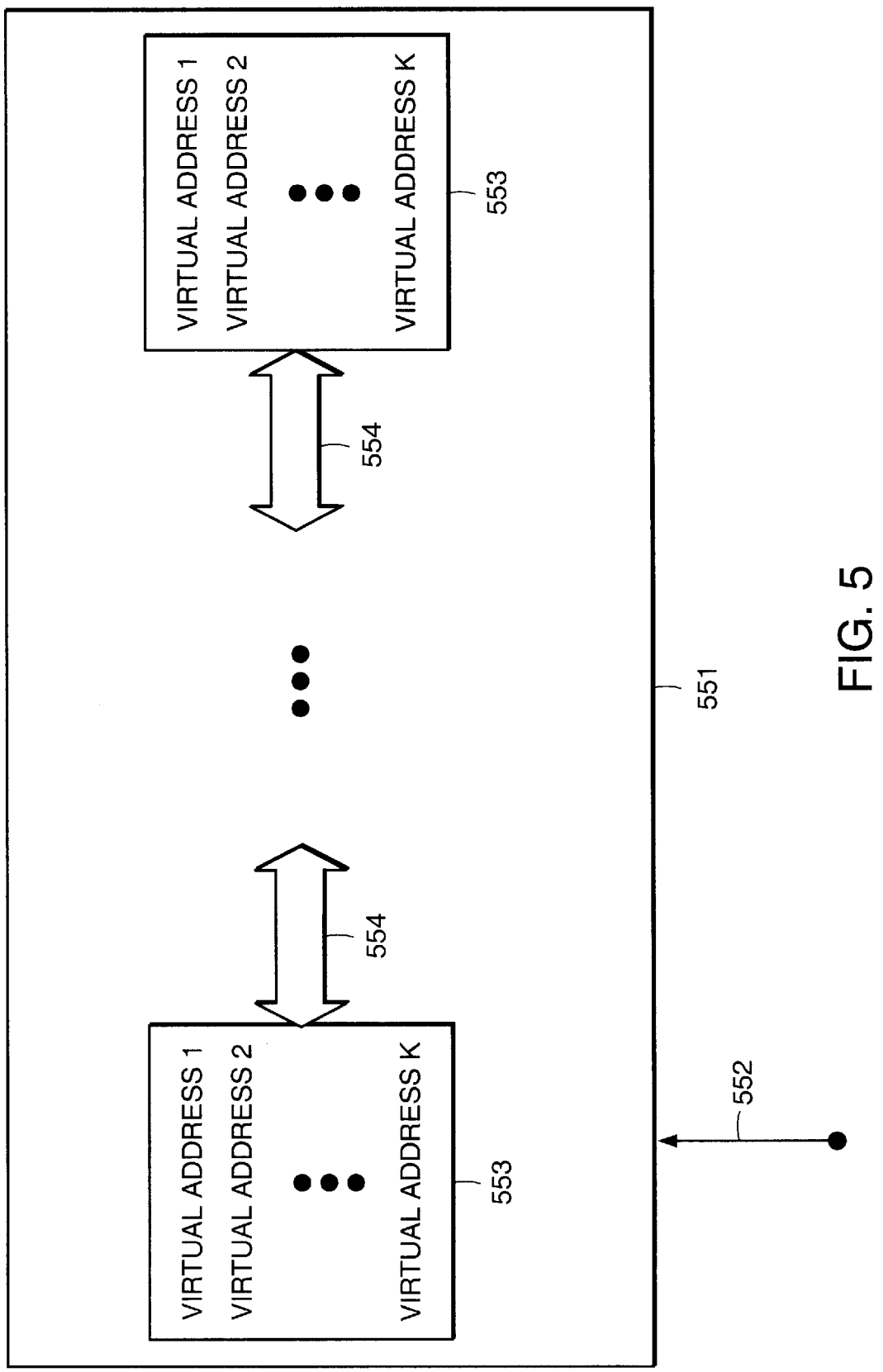
FIG. 5 shows a set of memory tables created in user space, according to an embodiment of the invention.

FIG. 5 shows a set of memory tables 551 created in user space, according to an embodiment of the invention. Monitor service 250 (FIG. 2) sets up at least one memory table 553 (FIG. 5) in user space, each table containing a set of virtual memory addresses which preferably corresponds to 2 gigabytes of memory. A virtual address is an address for a memory block that is not its actual memory address, and is useful for accessing new pages of cache memory as they are needed. Monitor service 250 creates these tables by making use of a feature of the operating system: normally, when the operating system sets up a user process, it sets up a virtual address map in user space. By setting up monitor service 250 as a "pseudo" user process, cache driver 230 uses this feature of the operating system to create the memory tables in user space. For example, in a WINDOWS operating system, "virtualalloc" calls are made to create the memory tables. When the tables are created, a handle 552 is created with which components of cache driver 230 such as memory monitor 232 can access the memory tables when accessing new pages of cache memory.

In order to set up multiple tables, more than one monitor pseudo-process is set up, with each pseudo-process creating its own memory table of virtual addresses. When more than one memory table is created, it may be necessary to perform a process context switch 554 when accessing a different table from the one that is currently open. Such context switches are known by those of ordinary skill in the art for other applications.

In accordance with embodiments of the invention, a user may specify the number of memory tables that are created in user space. For example, the user could specify how much memory is available on the system, and an appropriate number of 2-gigabyte tables could be created. In order to create more than two 2-gigabyte tables, such user input is necessary with some conventional operating systems, because they are unable to inform the user how much memory is available above 4 gigabytes.

Figure 6:
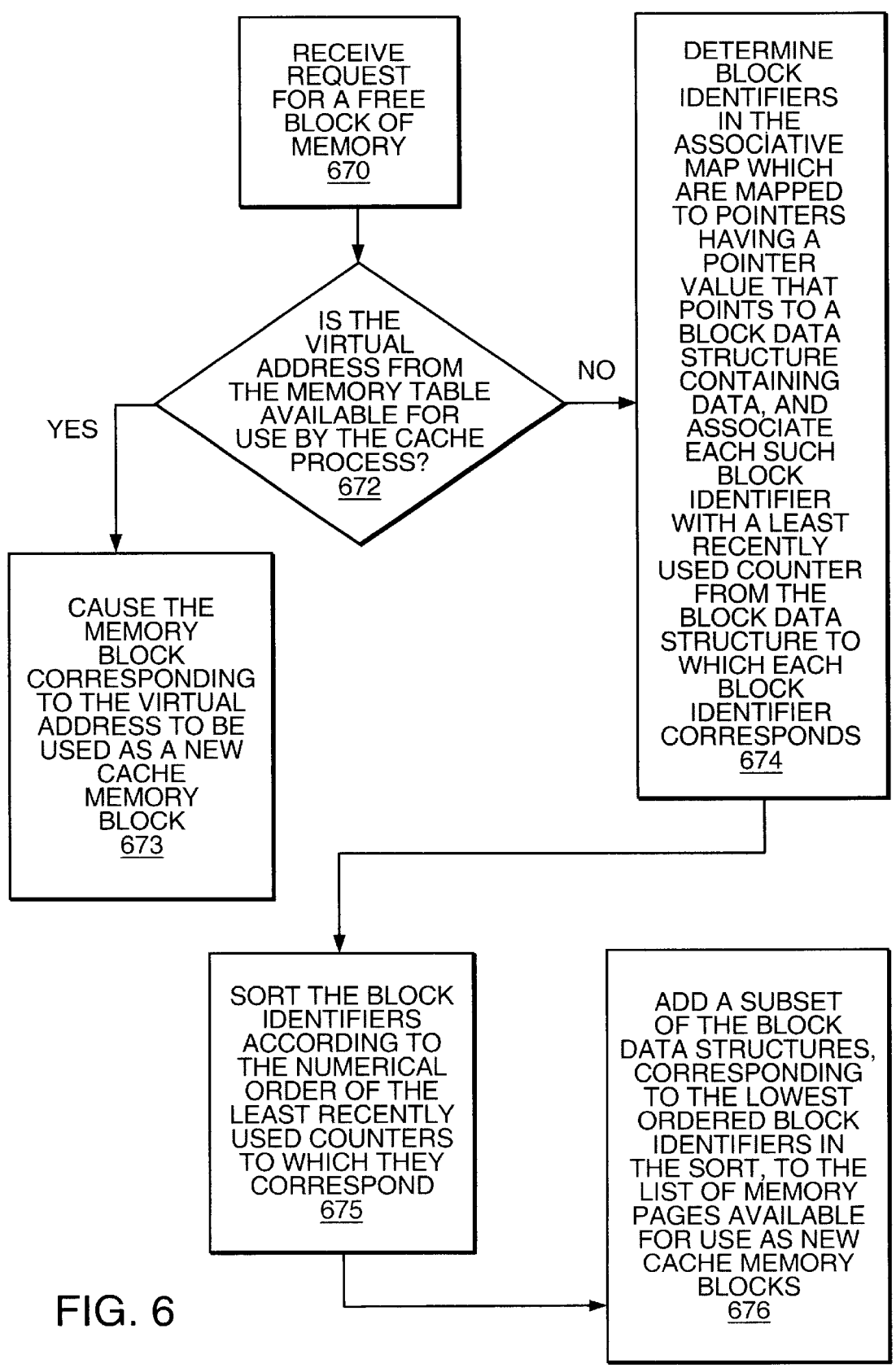
FIG. 6 is a flowchart of a process implemented by a free list manager according to an embodiment of the invention.

FIG. 6 is a flowchart of a process implemented by a free list manager (236 of FIG. 2) according to an embodiment of the invention. As described above, the free list manager maintains a list of unused memory pages for use in allocating memory to the cache. When the free list's list of unused pages reaches a pre-set minimum size, the free list manager implements the procedure of FIG. 6. At step 670, the free list manager receives a request for a free block of memory from the active list manager. The free list manager communicates with memory monitor 232, and determines if memory is available in the virtual address tables for use by the cache (step 672). If memory is available in the virtual address tables for use by the cache, the free list manager accesses a table using handle 552, locks a page of memory onto a virtual address from the table, and supplies the page to the active list manager for use as cache memory (step 673). If, however, the memory monitor indicates that available memory is running too low, the free list manager engages a policy that removes the least-recently accessed blocks from the cache list, and makes their memory space available for use as new cache blocks (steps 674–676). First, the free list manager determines block identifiers in the associative map which are mapped to pointers having values of type 393, i.e. that point to a data block structure, and determines the LRU counter for the data block structure (step 674). Then the free list manager sorts the block identifiers according to the numerical order of the LRU counters (step 675); the sort may be, for example, a quasi-heap sort or other kind of sort known to those of skill in the art. Finally, the free list manager adds a subset of the block data structures, corresponding to the lowest ordered block identifiers in the sort (which are consequently the least recently accessed blocks), to the list of memory pages available for use as new cache memory blocks (step 676).

In accordance with an embodiment of the invention, the number of the lowest ordered block identifiers that are recycled in this manner is adjustable in accordance with a user input maximum and minimum. In an embodiment, the user may effect adjustment of the maximum while the program is running through a user interface. The free list manager ensures that a number, representing the numbers of block identifiers which are mapped to pointers having a pointer value that points to a cache memory location containing data, does not fall below the user input minimum or exceed the maximum. In accordance with a further embodiment, a minimum and maximum may be input for each disk volume of a set of disk volumes, and the free list manager will maintain an associative map for each disk volume in accordance with the minimum and maximum.

Figure 7:
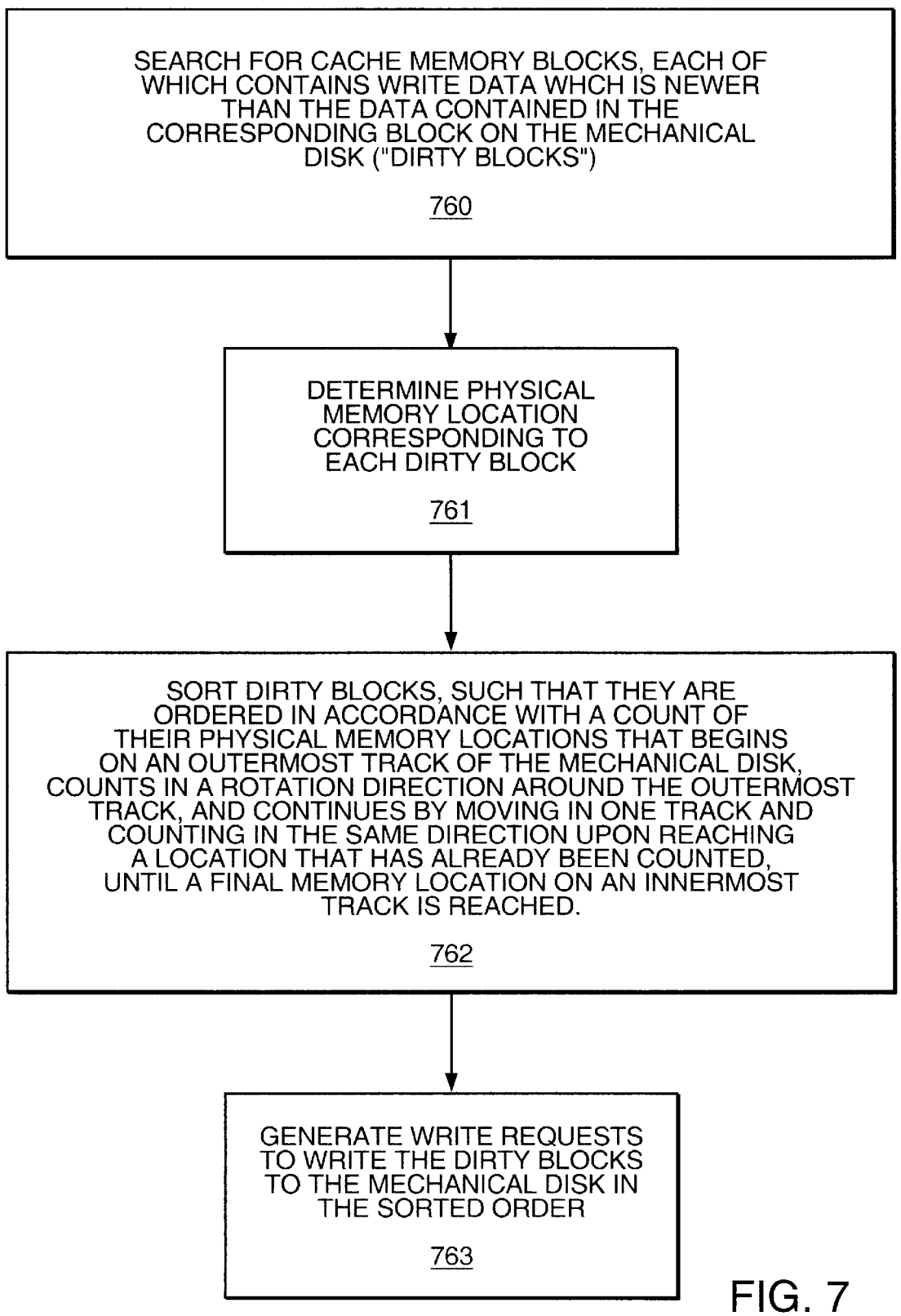
FIG. 7 is a flowchart of a process implemented by a lazy writer according to an embodiment of the invention.

FIG. 7 is a flowchart of a process implemented by a lazy writer according to an embodiment of the invention. As described above the lazy writer, when activated, becomes active periodically, and optimizes the order in which data is written to the mechanical disk drive. In step 760, the lazy writer searches for a quota of block data structures in the active list which contain data, written as the result of write requests, that is newer than the data contained in the corresponding block on the mechanical disk; these are called "dirty blocks." The quota can be adjusted in accordance with user input, and controls the "aggressiveness" of the lazy writer: the lower the quota, the more often data will be written to disk, and thus the less efficient the write order will be. On the other hand, the higher the quota, the greater the risk that data in the dirty blocks will be lost in a system crash, before they are written to disk. In step 761, the lazy writer determines a physical memory location on the mechanical disk corresponding to each dirty block of the quota; determining corresponding physical locations can be performed using an operating system command on most operating systems.

Figure 8:
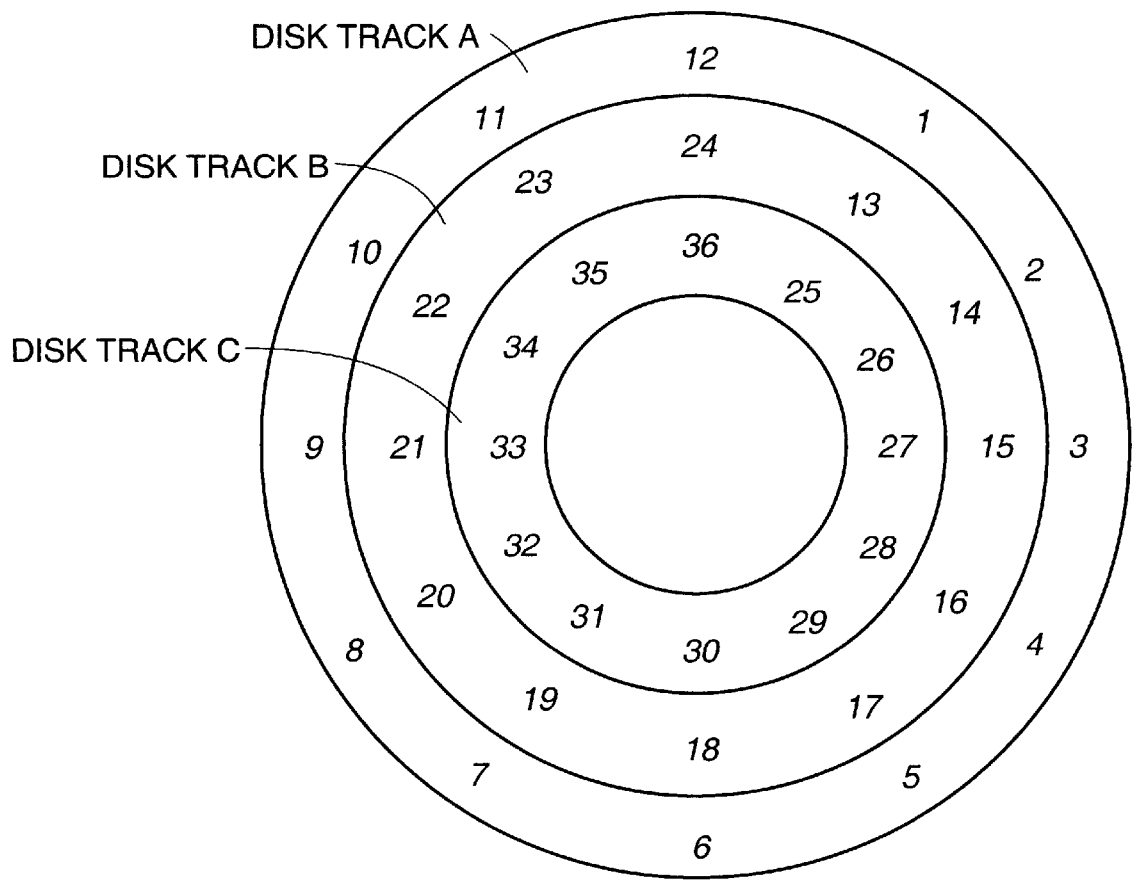
FIG. 8 shows a pattern for optimizing the order of writing to physical memory locations on a disk, in accordance with an embodiment of the invention.

Next, the lazy writer sorts the dirty blocks, so that they are ordered in a way that optimizes write efficiency (step 762). In particular, it is advantageous to minimize the number of times that the disk write head must reposition between disk cylinders. A cylinder is composed of corresponding tracks on a set of disks; thus, with reference to the disk of FIG. 8, a first cylinder is composed of corresponding disk track A's on a stack of disks; a second cylinder is composed of corresponding disk track B's on the stack, and so on. It is also advantageous for the disk head, within a disk track such as disk track A of FIG. 8, to make all writes that are required in a rotational path between two locations on the same track. Thus, for example, if write requests are to be made to locations 9, 5, 6, and 7 on disk track A then it is advantageous to write them in the order 9, 7, 6, 5 in a single rotation direction from 9 to 5.

Accordingly, in a preferred embodiment, the lazy writer implements the algorithm described in step 762 of FIG. 7.

Once physical memory locations have been determined corresponding to each block, the blocks are sorted into an optimal write order, according to their corresponding physical memory locations. The optimal order begins on an outermost track of the disk, rotates in one direction around the track, and continues by moving in one track and rotating in the same direction upon reaching a location that has already been reached, until a final memory location on an innermost track is reached. Thus, for example, with reference to FIG. 8, if physical memory locations 1–36 were located as shown on disk tracks A–C, the lazy writer would sort their blocks into an order that put block 1 first, followed by 2–12 (on track A), then 13–24 (on track B), and then 25–36 (on track C), in numerical order.

Finally, in step 763, the lazy writer instructs the disk block manager to write the sorted dirty blocks to disk, in the sorted order.

In accordance with further embodiments of the invention, metafile data is automatically placed in the cache. Metafile data describes where data is located on the mechanical disk. For example, in the WINDOWS NT operating system, such data is used for both a FAT file system and an NTFS file system. Since metafile data is being constantly accessed, embodiments of the invention automatically place it in block data structures associated with the associative map, thereby automatically caching it.

Figure 9:
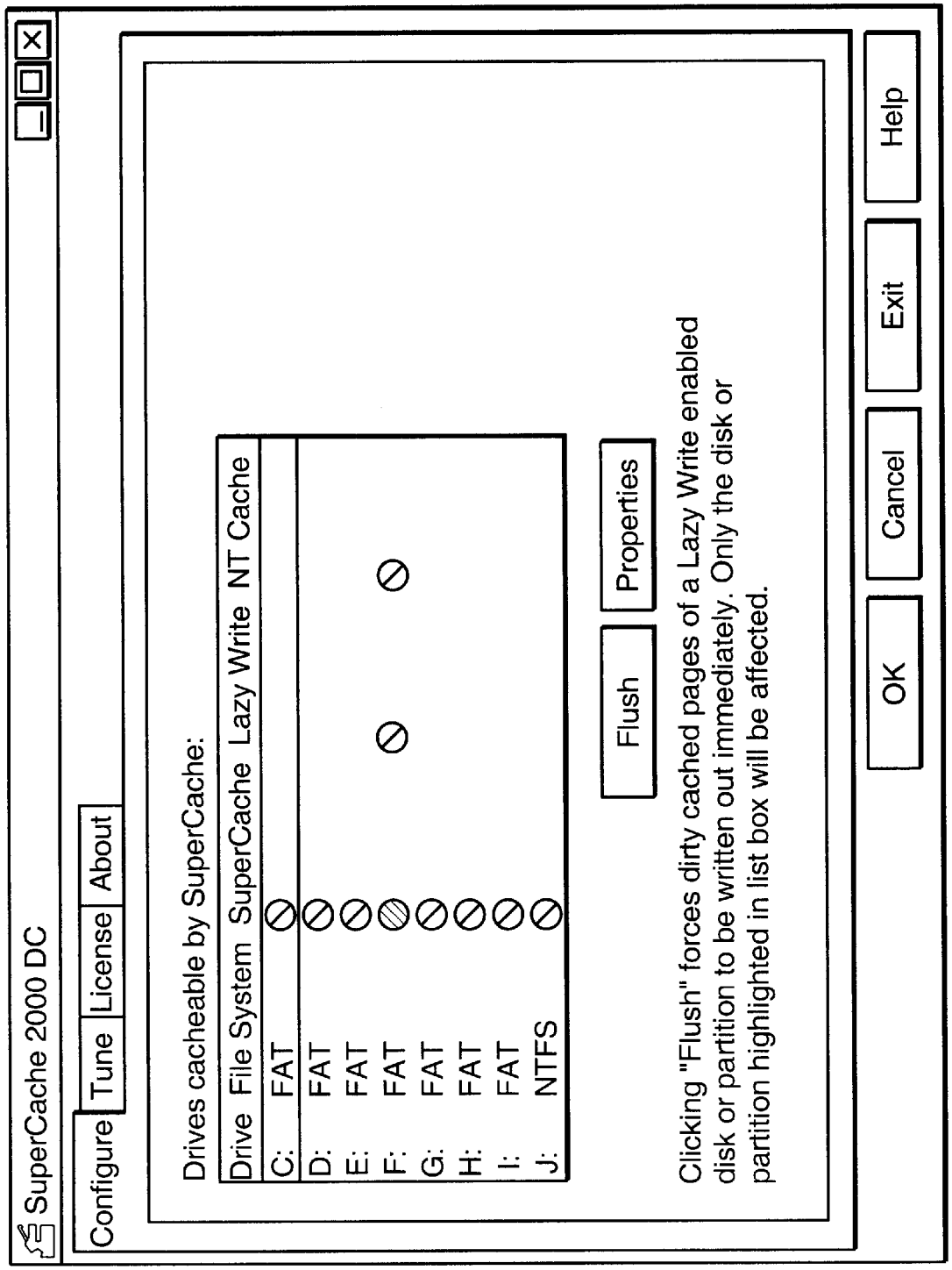
FIGS. 9–11 are user interface screen displays according to an embodiment of the invention.
Figure 10:
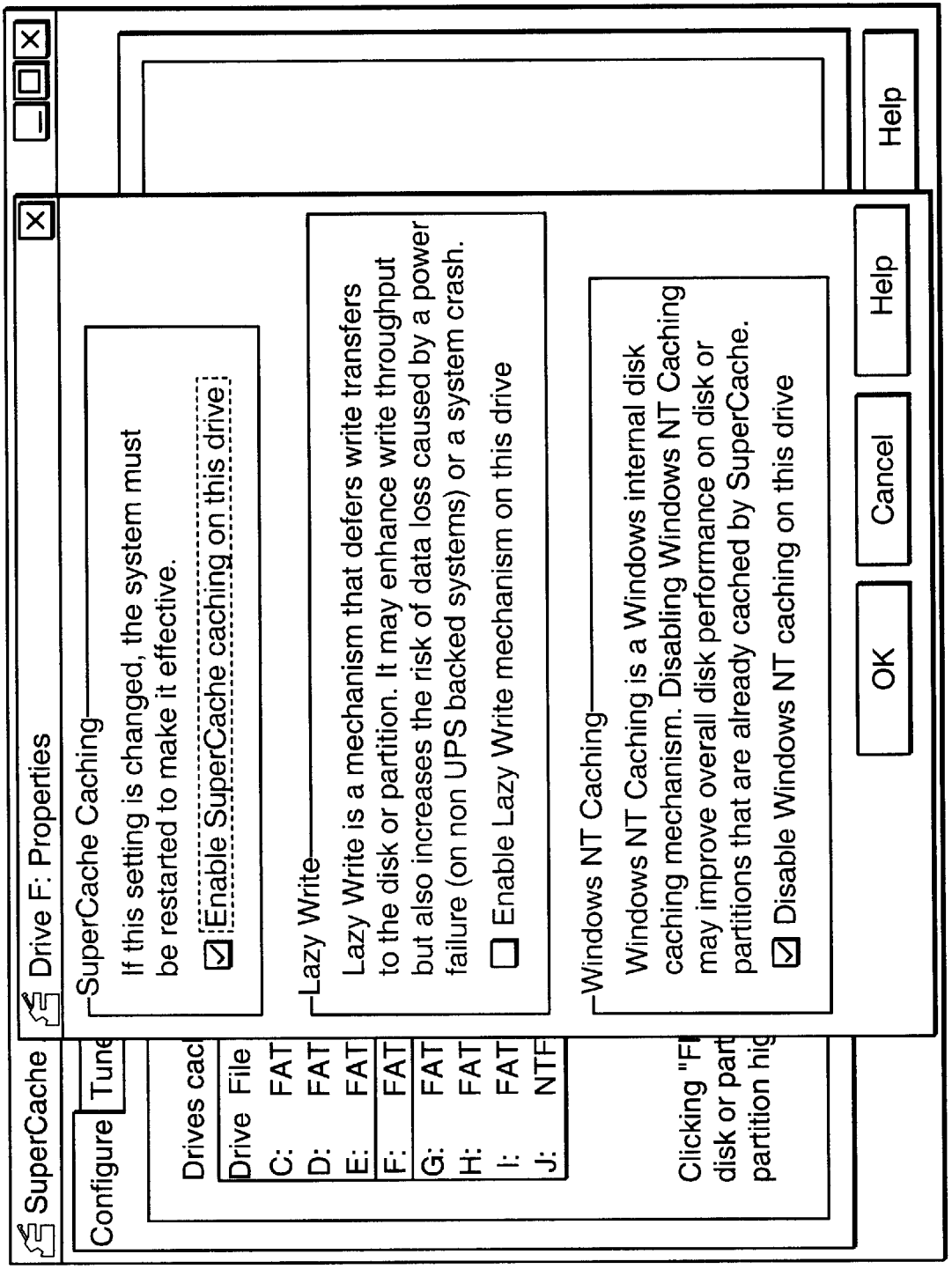

A graphic user interface through which a user can interact with a cache driver of an embodiment of the invention shall now be described with reference to FIGS. 9–11. FIG. 9 illustrates a configure screen which illustrates to the user each of the disks or partitions and, for each, provides an indication of (1) whether the cache driver of an embodiment of the invention (identified as SuperCache) is enabled or disabled, (2) whether Lazy Write is enabled or disabled and/or (3) whether file caching has been enabled or disabled for that digital partition. On the screen, the user has a "flush" input which can be used to immediately call for the lazy writer, for a selected disk or partition, to immediately write out all of its dirty cached pages to disk. Further user inputs can be accessed in this embodiment by selecting a disk or partition and accessing its properties as illustrated in FIG. 10 for disk partition F.

The properties screen can give the user a number of inputs through which the user can enable or disable features provided by the cache driver. A first input may be used to enable or disable the loaded cache driver. Disabling the cache driver 230 for a given drive or partition causes the active list manager 235 to operate in a low overhead pass-through mode. In some implementations, it may be necessary to restart the system to make the user's input effective as to enabling or disabling a cache driver. In another embodiment, enabling or disabling the cache driver may be switched while the program is running. If the cache driver for a disk is disabled while applications are running, all dirty cache pages will be first flushed to disks. A second input permits the user to enable or disable the Lazy Write mechanism for a given drive or partition. For applications which require maximum safety for the data to prevent loss due to power failure, it is often desirable to disable the Lazy Write mechanism. While the Lazy Write mechanism accelerates the speed with which the program runs, it defers the write transfers to the disk thereby increasing the risk of data loss. A third input available to the user is the ability to enable or disable file caching for a given disk or partition. The user input is associated with the lookup table used in conjunction with the file cache disabler 140 to implement the user's selections.

Figure 11:
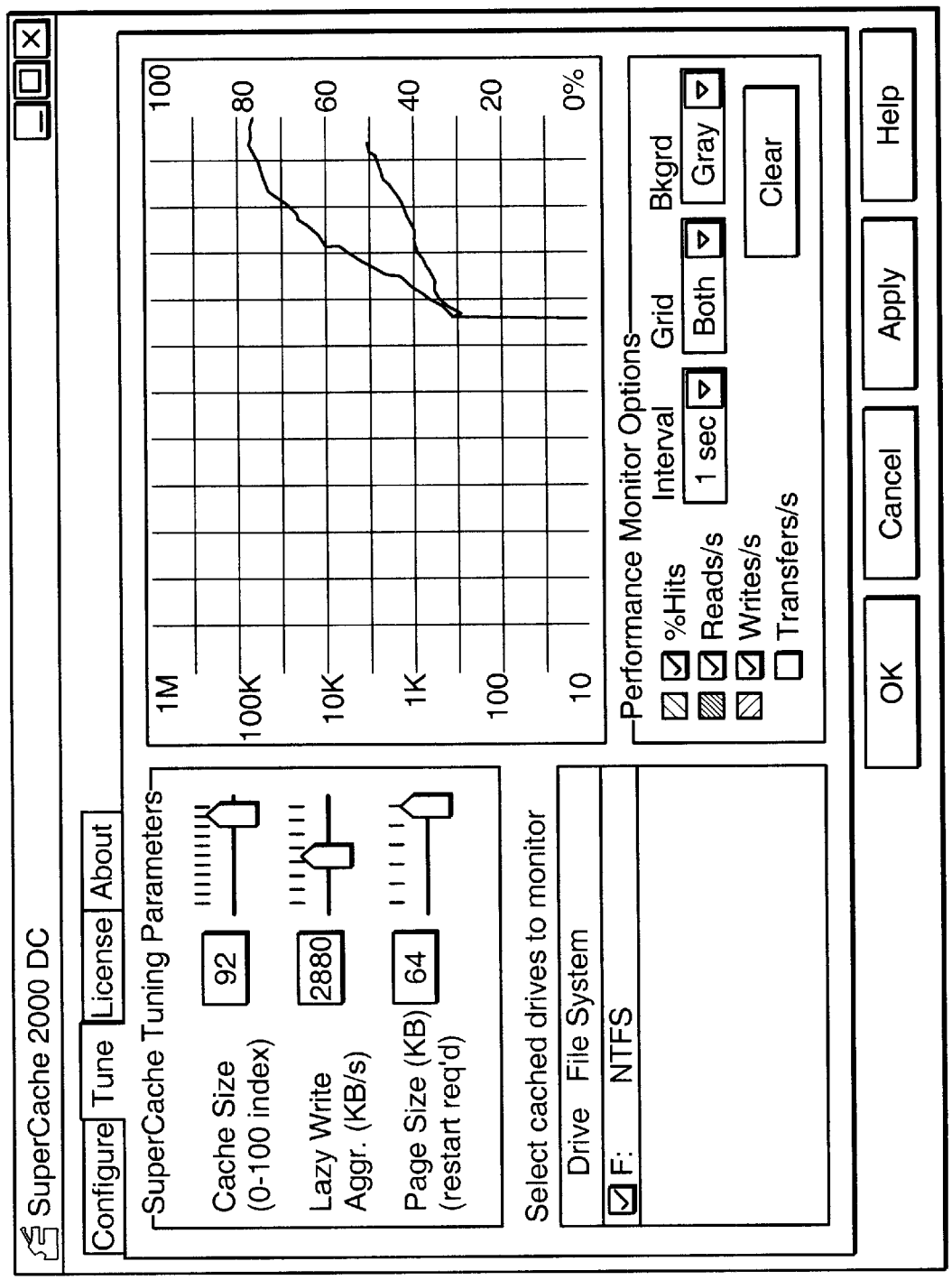

Referring now to FIG. 11, a screen is shown in which a user can tune an active cache driver. In accordance with an embodiment of the invention, real time feedback may be provided to the user to help in the setting of parameters for operation of the cache driver. It is desirable to provide the user with access to information regarding, performance criteria. Such criteria may include such things as the number of reads per second completed, the number of writes per second completed or the percentage of such requests which are satisfied by the cache. The read rate per second and the write rate per second may be added to provide the number of transfers per second. The user display screen of FIG. 11 provides the user the ability to see any or all of this data on a graphic display. The user is also given the ability to select a sampling interval and choose which of the parameters are of interest. Where risk to the data is of little concern to the user in a given application, the user may be interested in maximizing the read rate or the write rate. These rates may change as the user tunes the various available parameters of the cache driver.

The graphic user display of FIG. 11 provides three tunable parameters each with an on-screen slider which the user may manipulate to adjust the parameter while the cache driver is operating. The cache size slider adjusts the amount of memory used up by the cache. In one embodiment, the slider adjusts the maximum number of block identifiers mapped to pointers having a pointer value that points to a cache memory location containing data. This is used by the free list manager which insures that the number of block identifiers does not exceed the set maximum. When cache size is increased, additional resources for the cache may be allocated to create cache pages to be added to the free list. When the user reduces the cache size through the user display input, the cache driver first reduces the size of the free list. If the free list contains enough pages to accommodate the requested release, then the free list is reduced in size. Otherwise, in addition, the required number of the oldest pages on the active pages are flushed and released.

The user may also adjust Lazy writer aggressiveness. The adjustment on the user interface slider changes the quota number used by the Lazy writer as described above with respect to FIG. 7. The quota number controls how often the Lazy writer will write data to disk. It controls how many dirty cache pages are allowed to remain on the list before they need to start getting written to disk.

A further user input is a slider for page size. The free list manager 235 looks to this parameter set by the user to determine the size of each cache page that it creates. In one embodiment, a change to page size requires the system to be rebooted. In an alternate embodiment, page size may be changed while the applications are running. To accommodate this, pages on each of the active list and the free list are grouped together to form larger pages, or partitioned to form smaller pages. Each of the cache driver tuning parameters is applicable to a given disk drive or partition.

In conclusion, embodiments of the invention provide a high-speed substitute cache that has enhanced cache memory, a straightforward and fast cache list, efficient recycling of cache memory, and optimized write orders to disk, and which minimizes wasteful creation and destruction of file caching data structures. Computers running software according to the invention have been clocked as being over twenty times faster than those running conventional caching software, for certain applications.

Although this description has set forth the invention with reference to several preferred embodiments, one of ordinary skill in the art will understand that one may make various modifications without departing from the spirit and the scope of the invention, as set forth in the claims.

What is claimed is:

1. A method of caching data in a computer having an operating system with a file caching mechanism, the method comprising:

intercepting an input/output request stream;

disabling the file caching mechanism with respect to all requests in the request stream that are directed to at least one selected disk volume; and accessing a direct block cache to satisfy a request of the request stream.

2. A method according to claim 1, the method further comprising:

creating, in a user mode portion of the computer, at least one memory tables comprising a set of virtual memory addresses; and accessing a memory table of the at least one memory tables when allocating memory to a cache.

3. A method according to claim 2, the method further comprising:

in a cache list, searching for blocks, each of which contains data, written as a result of a write request, that is more recent than data present in the corresponding block on a mechanical disk;

when a quota number of such blocks is found, sorting the blocks into an optimal write order; and generating at least one request to write the blocks to the mechanical disk in the optimal write order.

4. A method according to claim 2, the method further comprising:

creating an associative map which, for each given block of a set of blocks, maps a block identifier for the given block to a pointer, the pointer taking a value chosen from the values of:
 (i) a pointer value signifying that there is no data in cache memory corresponding to the given block; and
 (ii) a pointer value that points to a cache memory location containing data from the given block.

5. A method according to claim 1, wherein the method is a method of caching data in a computer having a window-based operating system.

6. A method according to claim 1, wherein disabling the file caching mechanism comprises consulting a look-up table in response to an open file request and disabling the mechanism based on disk volume identifier entries in the look-up table.

7. A method according to claim 6, wherein the method comprises adjusting the entries in the look-up table in accordance with input from a user.

8. A method according to claim 1, wherein disabling comprises setting an enable bit in a header of a file that is the subject of an open file request.

9. A method according to claim 1, the method further comprising:

in a cache list, searching for blocks, each of which contains data, written as a result of a write request, that is more recent than data present in the corresponding block on a mechanical disk;

when a quota number of such blocks is found, sorting the blocks into an optimal write order; and generating at least one request to write the blocks to the mechanical disk in the optimal write order.

10. A method according to claim 9, wherein searching for blocks is instituted periodically, with a wake-up time period.

11. A method according to claim 10, wherein the method comprises adjusting the wake-up time period in accordance with user input.

12. A method according to claim 9, wherein the method comprises adjusting the quota number in accordance with user input.

13. A method according to claim 9 wherein sorting comprises sorting the blocks such that the blocks are ordered in accordance with a count of physical memory locations, one physical memory location corresponding to each block, the count beginning at a physical memory location on an outermost track of the disk, counting in a rotation direction around the outermost track, and continuing by moving in one track and counting in the same rotation direction upon reaching a location that has already been counted, until a final memory location on an innermost track is reached.

14. A method according to claim 1, the method further comprising:

creating an associative map which, for each given block of a set of blocks, maps a block identifier for the given block to a pointer, the pointer taking a value chosen from the values of:
 (i) a pointer value signifying that there is no data in cache memory corresponding to the given block; and
 (ii) a pointer value that points to a cache memory location containing data from the given block.

15. A method according to claim 14, wherein the method further comprises:

upon receipt of an input/output request involving a block of the set of blocks, determining the value of the pointer to which the block identifier for the block is mapped in the associative map.

16. A method according to claim 15, wherein the method further comprises:

upon determining that the value of the pointer is the pointer value that points to a cache memory location containing data from the given block, accessing the cache memory location to satisfy the input/output request.

17. A method according to claim 16, wherein the method further comprises:

upon determining that the value of the pointer is the pointer value that points to a cache memory location containing data from the given block, updating a least recently used counter field for the given block in the cache memory location to be equal to the value of a global least recently used counter.

18. A method according to claim 15, wherein the method further comprises:

upon determining that the value of the pointer is the pointer value signifying that there is no data in cache memory corresponding to the given block, generating a request to receive a free block of memory to be used as a new cache memory block.

19. A method according to claim 18, wherein the method further comprises:

upon receiving the request for a free block of memory, determining whether a virtual address from the memory table is available for use by the direct block cache; and if a virtual address from the memory table is available for use by the direct block cache, causing the memory block corresponding to the virtual address to be used as the new cache memory block.

20. A method according to claim 18, wherein the method further comprises:

upon receiving the request for a free block of memory, determining whether a virtual address from the memory table is available for use by the direct block cache; and if a virtual address from the memory table is not available for use by the direct block cache,
  (i) searching for block identifiers in the associative map which are mapped to pointers having a pointer value that points to a cache memory location containing data, and associating each such block identifier with a least recently used counter from the cache memory location to which each block identifier corresponds;
  (ii) sorting the block identifiers according to the numerical order of the least recently used counters to which they correspond; and
  (iii) for each of a number of the lowest ordered block identifiers that is at least one, causing the memory block corresponding to the pointer value, to which the at least one block identifier is mapped, to be added to a list from which the new cache memory block may be chosen.

21. A method according to claim 20 wherein the method further comprises adjusting the number of the lowest ordered block identifiers in accordance with a user input maximum and minimum, such that a number, representing the block identifiers which are mapped to pointers having a pointer value that points to a cache memory location containing data, does not fall below the minimum or exceed the maximum.

22. A method according to claim 21 wherein adjusting the number of lowest ordered block identifiers comprises so adjusting the number of lowest ordered block identifiers for each disk volume of a set of disk volumes.

23. A method according to claim 1 wherein the method comprises adjusting, by number of sectors of data per block, a size per block of a set of blocks in accordance with user input.

24. A method according to claim 23 wherein the method comprises adjusting the size per block in a range from 2 sectors per block to 64 sectors per block.

25. A method according to claim 1, wherein the method comprises caching metafile data for a file system of the operating system.

26. A method of caching data in a computer having an operating system, a kernel mode portion, and a user mode portion, the method comprising:
  creating, in the user mode portion, at least one memory tables comprising a set of virtual memory addresses corresponding to physical addresses in the user mode portion; and
  accessing a memory table of the at least one memory tables when allocating memory to a cache.

27. A method according to claim 26, wherein the method comprises creating more than one memory tables.

28. A method according to claim 27, wherein the method comprises switching contexts between tables of the more than one memory tables.

29. A method according to claim 26, wherein the method comprises adjusting, in accordance with user input, the number of memory tables created.

30. A method according to claim 26, wherein the method comprises utilizing a program of the operating system, that is used for setting up user process virtual address maps, to create the at least one memory table.

31. A method according to claim 26, wherein the method comprises creating at least one memory table containing virtual addresses corresponding to at least 2 GB of memory.

32. A method according to claim 26, the method further comprising:
  in a cache list, searching for blocks, each of which contains data, written as a result of a write request, that is more recent than data present in the corresponding block on a mechanical disk;
  when a quota number of such blocks is found, sorting the blocks into an optimal write order; and
  generating at least one request to write the blocks to the mechanical disk in the optimal write order.

33. A method according to claim 32, wherein searching for blocks is instituted periodically, with a wake-up time period.

34. A method according to claim 33, wherein the method comprises adjusting the wake-up time period in accordance with user input.

35. A method according to claim 32, wherein the method comprises adjusting the quota number in accordance with user input.

36. A method according to claim 32, wherein the method comprises activating and de-activating, in accordance with user input, the set of steps of searching, sorting, and writing.

37. A method according to claim 32 wherein sorting comprises sorting the blocks such that the blocks are ordered in accordance with a count of physical memory locations, one physical memory location corresponding to each block, the count beginning at a physical memory location on an outermost track of the disk, counting in a rotation direction around the outermost track, and continuing by moving in one track and counting in the same rotation direction upon reaching a location that has already been counted, until a final memory location on an innermost track is reached.

38. A method according to claim 26, the method further comprising:
  creating an associative map which, for each given block of a set of blocks, maps a block identifier for the given block to a pointer, the pointer taking a value chosen from the values of:
    (i) a pointer value signifying that there is no data in cache memory corresponding to the given block; and
    (ii) a pointer value that points to a cache memory location containing data from the given block.

39. A method according to claim 38, wherein the method comprises:
  upon receipt of an input/output request involving a block of the set of blocks, determining the value of the pointer to which the block identifier for the block is mapped in the associative map.

40. A method according to claim 39, wherein the method comprises:
  upon determining that the value of the pointer is the pointer value that points to a cache memory location containing data from the given block, accessing the cache memory location to satisfy the input/output request.

41. A method according to claim 40, wherein the method further comprises:
  upon determining that the value of the pointer is the pointer value that points to a cache memory location containing data from the given block, updating a least recently used counter field for the given block in the cache memory location to be equal to the value of a global least recently used counter.

42. A method according to claim 39, wherein the method further comprises:
  upon determining that the value of the pointer is the pointer value signifying that there is no data in cache memory corresponding to the given block, generating a request to receive a free block of memory to be used as a new cache memory block.

43. A method according to claim 42, wherein the method further comprises:
  upon receiving the request for a free block of memory, determining whether a virtual address from the memory table is available for use by the direct block cache; and
  if a virtual address from the memory table is available for use by the direct block cache, causing the memory block corresponding to the virtual address to be used as the new cache memory block.

44. A method according to claim 42, wherein the method further comprises:
  upon receiving the request for a free block of memory, determining whether a virtual address from the memory table is available for use by the direct block cache; and
  if a virtual address from the memory table is not available for use by the cache,
    (i) searching for block identifiers in the associative map which are mapped to pointers having a pointer value that points to a cache memory location containing data, and associating each such block identifier with a least recently used counter from the cache memory location to which each block identifier corresponds;
    (ii) sorting the block identifiers according to the numerical order of the least recently used counters to which they correspond; and
    (iii) for each of a number of the lowest ordered block identifiers that is at least one, causing the memory block corresponding to the pointer value, to which the at least one block identifier is mapped, to be added to a list from which the new cache memory block may be chosen.

45. A method according to claim 44 wherein the method further comprises adjusting the number of the lowest ordered block identifiers in accordance with a user input maximum and minimum, such that a number, representing the block identifiers which are mapped to pointers having a pointer value that points to a cache memory location containing data, does not fall below the minimum or exceed the maximum.

46. A method according to claim 45 wherein adjusting the number of lowest ordered block identifiers comprises so adjusting the number of lowest ordered block identifiers for each disk volume of a set of disk volumes.

47. A method according to claim 26 wherein the method comprises adjusting, by number of sectors of data per block, a size per block of a set of blocks in accordance with user input.

48. A method according to claim 47 wherein the method comprises adjusting the size per block in a range from 2 sectors per block to 64 sectors per block.

49. A method according to claim 26, wherein method comprises caching metafile data for a file system of the operating system.

50. A cache process operating in a computer having an operating system with a file caching mechanism, the cache process comprising:
  a direct block caching driver for caching a set of disk volumes; and
  a file cache disablement module for selectively disabling the file caching mechanism with respect to at least one selected disk volume of the set of disk volumes.

51. A cache process according to claim 50 wherein the file cache disablement module intercepts I/O requests and disables the file caching mechanism by appropriately setting a file cache enable bit in a file that is the subject of an open file request.

52. A cache process according to claim 50 wherein the direct block caching driver is in kernel mode and the cache process further comprises
  a cache memory expansion process.

53. A cache process according to claim 52 wherein the cache memory expansion process comprises:
  a memory table creation process for creating, in a user mode portion of the computer, at least one memory table comprising a set of virtual memory addresses; and
  a handle passing process for providing to the direct block caching driver a handle enabling the direct block caching driver to access the at least one memory table when allocating memory to a cache.

54. A cache process according to claim 50, wherein the direct block caching driver comprises a lazy writer process, the lazy writer process comprising:
  a dirty block search process for searching for blocks, each of which contains data, written as a result of a write request, that is more recent than data present in the corresponding block on a mechanical disk;
  a write sort process for sorting into an optimal write order the blocks found by the dirty block search process when a quota number of such blocks is found; and
  a disk write request generator for generating requests to write such blocks to the mechanical disk in the optimal write order.

55. A cache process according to claim 50, wherein the direct block caching driver comprises an active list manager, the active list manager comprising an associative map process for creating an associative map which, for each given block of a set of blocks, maps a block identifier for the given block to a pointer, the pointer taking a value chosen from the values of:
  (i) a pointer value signifying that there is no data in cache memory corresponding to the given block; and
  (ii) a pointer value that points to a cache memory location containing data from the given block.

56. A cache process operating in a computer having an operating system, a kernel mode portion, and a user mode portion, the process comprising:
  a direct block caching driver for creating a cache; and
  a cache memory expansion process, the memory expansion process comprising:
    a memory table creation process for creating, in the user mode portion of the computer, at least one memory table comprising a set of virtual memory addresses; and
    a handle passing process for providing to the cache driver a handle enabling the direct block caching driver to access the at least one memory table when allocating memory to the cache.

57. A cache process according to claim 56, wherein the cache driver comprises a lazy writer process, the lazy writer process comprising:
  a dirty block search process for searching for blocks, each of which contains data, written as a result of a write request, that is more recent than data present in the corresponding block on a mechanical disk;
  a write sort process for sorting into an optimal write order the blocks found by the dirty block search process when a quota number of such blocks is found; and
  a disk write request generator for generating requests to write such blocks to the mechanical disk in the optimal write order.

58. A cache process according to claim 56, wherein the cache driver comprises an active list manager, the active list manager comprising an associative map process for creating an associative map which, for each given block of a set of blocks, maps a block identifier for the given block to a pointer, the pointer taking a value chosen from the values of:
  (i) a pointer value signifying that there is no data in cache memory corresponding to the given block; and
  (ii) a pointer value that points to a cache memory location containing data from the given block.

59. A method of caching data in a computer comprising:
  enabling a direct block cache with respect to at least one selected disk volume, said direct block cache characterized by caching parameters;
  displaying cache performance data on a user interface;
  adjusting at least one of the caching parameters in response to user input;
  in a cache list of said direct block cache, searching for blocks, each of which contains data, written as a result of a write request, that is more recent than data present in the corresponding block on the at least one selected disk volume; and
  when a quota number of such blocks is found, generating at least one request to write blocks to the at least one selected disk volume.

60. The method of claim 59 wherein the quota number is one of the caching parameters that may be subject to the act of adjusting.

61. The method of claim 59 further comprising disabling said direct block cache while applications continue to run on said computer wherein, in response to an instruction to disable, at least one request to write blocks to the at least one selected disk volume are generated to flush dirty blocks from said direct block cache.

62. The method of claim 59 wherein cache block size is one of the caching parameters and adjusting cache block size comprises increasing or decreasing all cache blocks by a power of 2.

63. The method of claim 59 wherein cache size is one of the caching parameters and adjusting cache size comprises adding resources to a free list.

64. The method of claim 59 wherein cache size is one of the caching parameters and adjusting cache size comprises reducing resources in a free list.

65. The method of claim 64 wherein adjusting cache size further comprises generating at least one request to write blocks to the at least one selected disk volume to flush dirty blocks from said direct block cache.

66. The method of claim 59 wherein displaying cache performance data comprises displaying a graph plotting a performance criteria against a series of time intervals.

67. The method of claim 59 wherein displaying cache performance data comprises displaying number of reads per time interval.

68. The method of claim 59 wherein displaying cache performance data comprises displaying number of writes per time interval.

69. The method of claim 59 wherein displaying cache performance data comprises displaying number of data transfers per time interval.

70. The method of claim 59 wherein displaying cache performance data comprises displaying percentage of transfer requests satisfied by said direct block cache over a time interval.

71. A method of caching data in a computer comprising:
  enabling a cache driver to create a cache with respect to at least one selected disk volume, said cache characterized by caching parameters including a cache size and cache page size;
  running an application program on said computer;
  receiving a request at the cache driver asking for an adjustment of at least one of the caching parameters; and
  adjusting, while the application continues to run, the at least one of the caching parameters in response to receipt of the request.

72. A method of caching data in a computer comprising:
  enabling a cache driver to create a cache with respect to at least one selected disk volume, said cache characterized by caching parameters;
  displaying cache performance data on a user interface;
  receiving an input/output control call (IOCTL) at the cache driver requesting an adjustment of at least one of the caching parameters; and
  adjusting the at least one caching parameter in response to receipt of the IOCTL.

73. A method of caching data in a computer having an operating system, a kernel mode portion, and a user mode portion, the method comprising:
  utilizing a program of the operating system, that is used for setting up user process virtual address maps, to create in the user mode portion, at least one memory tables comprising a set of virtual memory addresses; and
  accessing a memory table of the at least one memory tables when allocating memory to a cache.

74. A method of caching data in a computer having an operating system, a kernel mode portion, and a user mode portion, the method comprising:
  creating, in the user mode portion, at least one memory tables comprising a set of virtual memory addresses;
  accessing a memory table of the at least one memory tables when allocating memory to a cache; and
  creating an associative map which, for each given block of a set of blocks, maps a block identifier for the given block to a pointer, the pointer taking a value chosen from the values of:
    (i) a pointer value signifying that there is no data in cache memory corresponding to the given block; and
    (ii) a pointer value that points to a cache memory location containing data from the given block.

75. A method of caching data in a computer having an operating system, a kernel mode portion, and a user mode portion, the method comprising:
  creating, in the user mode portion, at least two memory tables each comprising a set of virtual memory addresses;
  accessing a memory table of the at least two memory tables when allocating memory to a cache; and
  switching contexts between tables of the at least two memory tables.

* * * * *